(12) United States Patent
Adams et al.

(10) Patent No.: US 7,261,863 B2
(45) Date of Patent: Aug. 28, 2007

(54) CLOSED LOOP CONTINUOUS POLYMERIZATION REACTOR AND POLYMERIZATION PROCESS

(75) Inventors: David Charles Adams, Lancashire (GB); Howard Jones, Lancashire (GB); Kenneth Raymond Geddes, Lancashire (GB)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/778,192

(22) Filed: Feb. 7, 2001

(65) Prior Publication Data

US 2001/0022951 A1 Sep. 20, 2001

Related U.S. Application Data

(63) Continuation of application No. PCT/EP99/04923, filed on Jul. 8, 1999.

(30) Foreign Application Priority Data

Aug. 7, 1998 (EP) .................................. 98202666

(51) Int. Cl.
*B01J 19/18* (2006.01)
*B08B 9/053* (2006.01)
(52) U.S. Cl. ................. 422/132; 422/135; 15/104.061
(58) Field of Classification Search ............... 422/131, 422/132, 134, 135, 137, 190, 210, 211, 214; 526/64; 15/3.5, 3.51
See application file for complete search history.

(56) References Cited

U.S. PATENT DOCUMENTS 3,220,432 A * 11/1965 Allen .......................... 137/268
3,425,083 A 2/1969 Wennerberg et al. .... 15/104.06
3,428,489 A * 2/1969 Gentry, Jr. ..................... 134/8
3,547,142 A * 12/1970 Webb .......................... 137/268
3,595,846 A * 7/1971 Rouzier ......................... 526/64
3,682,186 A 8/1972 Howe ............................. 137/1
5,242,827 A * 9/1993 Chaumont et al. ........ 435/292.1

FOREIGN PATENT DOCUMENTS

DE 32 33 557 3/1984
EP 0 633061 1/1995

OTHER PUBLICATIONS

Maurice Wilkinson and Ken Geddes, "An Award Winning Process", Chemistry in Britain, Dec. 1993, pp. 1050-1053.

\* cited by examiner

*Primary Examiner*—Glenn Caldarola
*Assistant Examiner*—Jennifer A. Leung
(74) *Attorney, Agent, or Firm*—David H. Vickrey; Michelle J. Burke

(57) ABSTRACT

A closed loop continuous emulsion polymerization apparatus at least comprising a circulation pump, a reactor tube which connects the outlet of the circulation pump to its inlet, at least one feed for supplying raw materials, an outlet, and means for cooling the tube, characterized in that the reactor further comprises an additional tube for by-passing a pig around the circulation pump, a pig receiving station which is in parallel connection with the circulation pump or the reactor tube, and optionally means for directing a pig into the pig receiving station. The invention allows simple removal of the pig from the reactor, afforts great freedom in selecting the type of circulation pump and material and shape of the pig, and enables total control over the launching of the pig substantially independent of the reaction medium flow.

18 Claims, 2 Drawing Sheets

CLOSED LOOP CONTINUOUS POLYMERIZATION REACTOR AND POLYMERIZATION PROCESS

This application is a continuation of PCT application PCT/EP99/04923, filed Jul. 8, 1999, which claims priority of European patent application No. 98202666.8, filed Aug. 7, 1998.

FIELD OF THE INVENTION

The invention pertains to a closed loop continuous emulsion polymerization reactor at least comprising a circulation pump, a reactor tube which connects the outlet of the circulation pump to its inlet, at least one feed for supplying raw materials, an outlet, and preferably means for cooling or heating the tube.

BACKGROUND OF THE INVENTION

Such a process is known from, int. al., M. Wilkinson and K. Geddes, "An award winning process," Chemistry in Britain, pp. 1050-1053, December 1993. This publication describes that emulsion polymers are manufactured by addition polymerization of low molecular weight unsaturated monomers, in the presence of water and stabilizers. In the past, the polymerization was carried out as a batch process or a delayed addition batch process, but in the late sixties the closed loop continuous reactor was first developed.

A problem encountered in polymerization processes employing a tubular reactor is the formation of deposits from the reaction products on the internal wall of the reactor. These deposits lead to a need for an increased delivery pressure from the circulation pump and impair heat transfer from the reaction medium to, e.g., a coolant in a jacket surrounding the reactor tube, thus leading to higher (and often deleterious) reactor temperatures or necessitating either an increased coolant circulation rate, a lower coolant temperature, or a reduced rate of production (so as to match the heat removal).

A further general disadvantage of a fouled reactor is the reduction of volume, increasing both the recycle rate and the shear on the emulsion. This shifts the process conditions which may have been optimized on a clean reactor. In any case, product properties will drift, nullifying the advantages of consistency of production expected from continuous reactors.

One way of cleaning the inside of tubes or pipework is the use of a cleaning member or pig which is forced through the tube. German patent application 32 33 557, for instance, describes various ways of using a pig for cleaning the internal wall of a tubular reactor. In one embodiment (illustrated in FIG. 1 of the application), two ball valves are provided in the reactor tube for receiving and launching one or more pigs. The reaction product is used to drive the pig and leaves the reactor after the pig has passed the outlet. Thus, the reaction product is not and cannot be recirculated, rendering this configuration unsuitable for continuous polymerization. In a further embodiment (FIG. 3), spherical-shaped scraper pigs are passed through the pump. This method imposes severe limitations on the shape of the pig and the type of pump used. For instance, the use of a positive displacement type pump to give the low shears desirable for emulsion polymer production is not possible.

For completeness' sake, it is noted that U.S. Pat. No. 3,425,083 discloses an endless pipe which has a bent form allowing a cleaning member to circulate constantly through the pipe and past its inlet and outlet for a liquid medium. The outlet has a smaller capacity than the inlet, so that part of the liquid medium is returned from the outlet through a return portion of the pipe to and past the inlet for recycling. No means are provided for removing the cleaning member or for interrupting its circulation. Further, the pipe is intended for heating liquids like milk and not for cooling reacting emulsions. In fact, reactors are not mentioned at all.

U.S. Pat. No. 3,682,186 discloses an apparatus for by-passing scrapers or product displacers around a pipeline booster or compression station. The main line is provided with two check valves for receiving and launching the pig. Loop reactors are not mentioned.

SUMMARY OF THE INVENTION

The invention has for an object to realize a continuous polymerization reactor employing a pig, which allows simple removal of the pig from the reactor without the necessity of shutting down the polymerization process. This affords great freedom in selecting the type of circulation pump and material and shape of the pig, and it enables total control over the launching of the pig substantially independent of the reaction medium flow. This is achieved by use of a reactor of the type described in the opening paragraph, which further comprises an additional tube for by-passing a pig around the circulation pump, a pig receiving station which is in parallel connection with the circulation pump or the reactor tube, and optionally means for directing the pig into the pig receiving station.

By the present idea, pigging can be fully automated and the pig can be replaced either during operation, simply by opening up of the pig receiving station without the flow of the reaction medium being disturbed, or during normal (e.g., weekly) maintenance, whichever is considered desirable. More importantly, however, the presence of a pig no longer limits the range of suitable circulation pumps, allowing the use of, e.g., pumps which impose low shear on the reaction medium. Also, the shape and material of the pig can be fully optimized for the reactor tube employed and the nature of the deposits.

The fact that the pig receiving station is not part of the main reactor tube and that the pig is actually removed from the reactor medium flow (as opposed to, e.g., remaining between two ball valves in the main flow) enables the operator of the reactor according to the present invention to launch the pig as and when he sees fit.

BRIEF DESCRIPTION OF THE DRAWINGS

Various aspects and advantages of the invention will become apparent upon review of the following detailed description and upon reference to the drawings in which.

DETAILED DESCRIPTION OF THE INVENTION

The pig receiving station may take the form of a side track somewhere in the loop reactor. Preferably, the station is integrated into the additional tube for by-passing a pig around the circulation pump. This can be achieved (comparatively) easily if the reactor tube is in fluid communication with the suction side of the circulation pump through an aperture in its wall and continues on to the delivery side of the circulation pump, the part of the tube between the suction and delivery sides of the circulation pump serving as a pig receiving station.

Once the pig approaches the suction side of the pump, it is led into the pig receiving station, allowing the emulsion to pass behind it into the circulation pump. The pig is then halted in the receiving station, where it remains until it is launched for the next cleaning cycle.

A significant advantage of this embodiment resides in the launch opening of the pig receiving station being positioned very close to the delivery side of the circulation pump, thus providing maximum thrust during the launching of the pig and improving the reliability of the launching system.

The pig can be launched using, e.g. in the case of polymerization of vinyl monomers in aqueous suspension, either the emulsion in the reactor or the water phase feed. Instead of a diversion of the water phase to launch the pig, a controlled "shot" of water or some other compatible fluid could be used to launch the pig.

In the reactor according to the present invention it is preferred that the aperture through which the reactor tube is in fluid communication with the suction side of the circulation pump is a slot extending substantially in the longitudinal direction of the tube. When the pig passes this slot, the force driving it is automatically lifted. It is further preferred that the width of the slot is smaller than the width of the pig, because, in that case, no additional means like a mesh or bars are required for directing the pig into the pig receiving station and to prevent the pig from leaving the tube.

It was found that by using a tapering slot of which the width increases downstream, the danger of fouling near the slot is reduced and the pressure in front of the pig can be kept to a minimum while at the same time sustaining ample pressure behind the pig to drive it into the pig receiving station.

The closed loop reactor according to the present invention preferably comprises a reactor tube of which at least a substantial part forms a helical coil. In comparison to the common trombone arrangement of the continuous tube (as disclosed in, e.g., M. Wilkinson and K. Geddes, "An award winning process," Chemistry in Britain, pp. 1050-1053, December 1993) the shape is more appropriate for pigging in that the pig is not forced to make sharp turns, thus reducing the wear of the pig and allowing the use of longer pigs. Furthermore, uncooled joints, which are one of the origins of wall fouling, can be avoided by using a helically coiled continuous tube.

The invention further pertains to a process for preparing (emulsion) polymers by means of the closed loop reactor described above. It is preferred that a pig is launched at intervals ranging from approximately 1 to approximately 60 minutes, preferably from approximately 10 to 20 minutes. Apart from more effective cleaning of the tube walls, regular disturbance of slow moving or static layers of emulsion polymer close to the tube walls will prevent or at least delay the onset of a poorly heat conducting stationary outer layer of polymer.

Some typical commercial monomers suitable for use in the present polymerization process include, e.g., butyl acrylate, methyl methacrylate, styrene, vinyl acetate, Veova 9, Veova 10, Veova 11 (all three ex Shell), ethyl acrylate, 2-ethyl hexyl acrylate, ethylene, and vinyl chloride. The addition reaction is initiated by radicals to give a dispersion of high molecular weight polymer particles usually of 50 to 3000 nm diameter suspended in a medium in which the polymer is insoluble, usually water. Common free radical generators include the sodium, potassium, and ammonium salts of peroxodisulphuric acid, e.g. ammonium peroxodisulphate. Alternatively, redox couples can be used. These consist of an oxidizing agent and a reducing agent. Commonly used oxidizers are the salts of peroxodisulphuric acid and t-butyl hydroperoxide and hydrogen peroxide itself. Reducers are sodium sulphite, sodium metabisulphite, sodium formaldehyde sulphoxylate, and sodium dithionate.

Polymerization of monomers in aqueous suspension is preferred and, in that case, raw materials are preferably provided by separate feed streams. These streams introduce fresh monomers and an aqueous solution of stabilizers known as the water phase or, e.g., a pre-emulsion of monomers and water and an aqueous solution in a separate small stream. The reactor is filled at the start of the reaction with water phase made up in a solution tank. Other fillings are possible, particularly with finished emulsion polymer (of the same or different composition) from a previous run, "as is" or diluted to any concentration; water; or an alternative special water phase used for the filling and possibly for the early stage of the run.

Agitation in the reactor is provided by the in-line circulation pump. Shortly after the feed streams start to flow, the monomers begin to react and heat is liberated. The temperature is stabilized by cooling means, usually by controlled circulation of a cooling fluid (e.g. water) through a cooling jacket. The product flows to the cooling tank where residual monomers converts to polymer. After cooling, the emulsion polymer is filtered to remove any oversize particles or gritty material in the strainer and transferred to the product storage tank.

Optionally, the polymerization process can be carried out under pressure, for instance under a pressure between 1 to 300 bar, but preferably between 5 to 100 bar, more preferably between 10 to 20 bar. Alternatively, the polymerization may be carried out at ambient pressure.

Within the framework of the present invention, the term "pig" comprises any element suitable for removing deposits and the like from the inner wall of tubular reactors and being carried through the reactor with the fluid stream. Other common terms for such an element are, e.g., "scraper" and "cleaning member". Pigs usually consist of soft or semi-hard natural or synthetic material, e.g. rubber or polyurethane. Also, pigs or scrapers with (flexible) metal parts or metal brushes as well as combinations of metal and a soft or semi-hard natural or synthetic material can be used. Of the numerous possible shapes, cylinders, cylinders with round edges as well as cylindrical bodies with thick lips and/or thick strips on the outer circumference are preferred. Dumbbell shaped cylindrical pigs have two scraping surfaces, as opposed to spherical surfaces which have only one. Also, the front scraping surface is (or can be) a leading edge scraper. A spherical pig has only one trailing edge.

The design of the pig and the materials used depend, among other things, on the type of deposit and the tolerances and radii of the reactor tube. Incidentally, it is noted that the amount of wear of the pig can be determined from the time needed for one cleaning cycle (a worn pig will require more time to complete a cycle). Preferred circulation pumps are, int. al., positive displacement pumps.

The invention will now be illustrated by means of two unlimitative examples.

Figure 1:
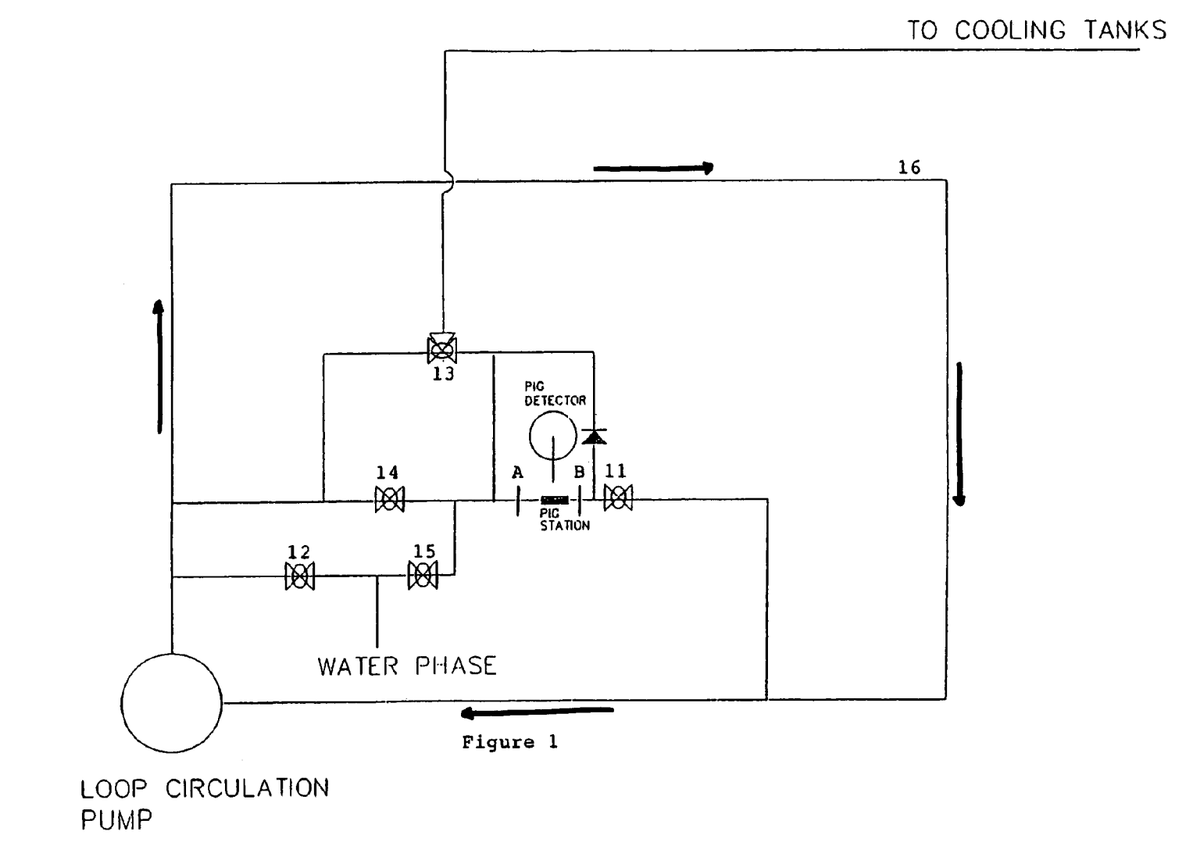
FIG. 1 is a schematic drawing of the closed loop continuous polymerization apparatus in accordance with one embodiment of the present invention.

FIG. 1 shows schematically a closed loop reactor in accordance with the invention. Prior to pigging, the reaction mixture flow is around the reactor tube 16. Water phase flows to the reactor 16 via valve 12, with valve 15 closed. Product overflows through the cooling tank line from the reactor via three-way valve 13 with valve 14 closed. The procedure to launch and receive the pig is as follows: 1) Check by means of the pig detector that the pig is correctly located in the pig station; 2) open valves 11 and 15, close valve 12; 3) after 15 seconds, open valve 12 and close valves 15 and 11; 4) open valve 14; 5) change valve 13 so that the flow of product is via valves 14 and 13; 6) observe arrival of the pig into the pig station by means of the pig detector, and 7) switch valve 13 so that the flow of product is direct and close valve 14.

Pig removal is carried out as follows: 1) close valves 11, 14, and 15; 2) split "quick release" couplings A and B; 3) remove the section of the pipework (i.e., the pig station); 4) remove the pig for inspection and replace if necessary, and 5) reassemble couplings A and B.

Figure 2:
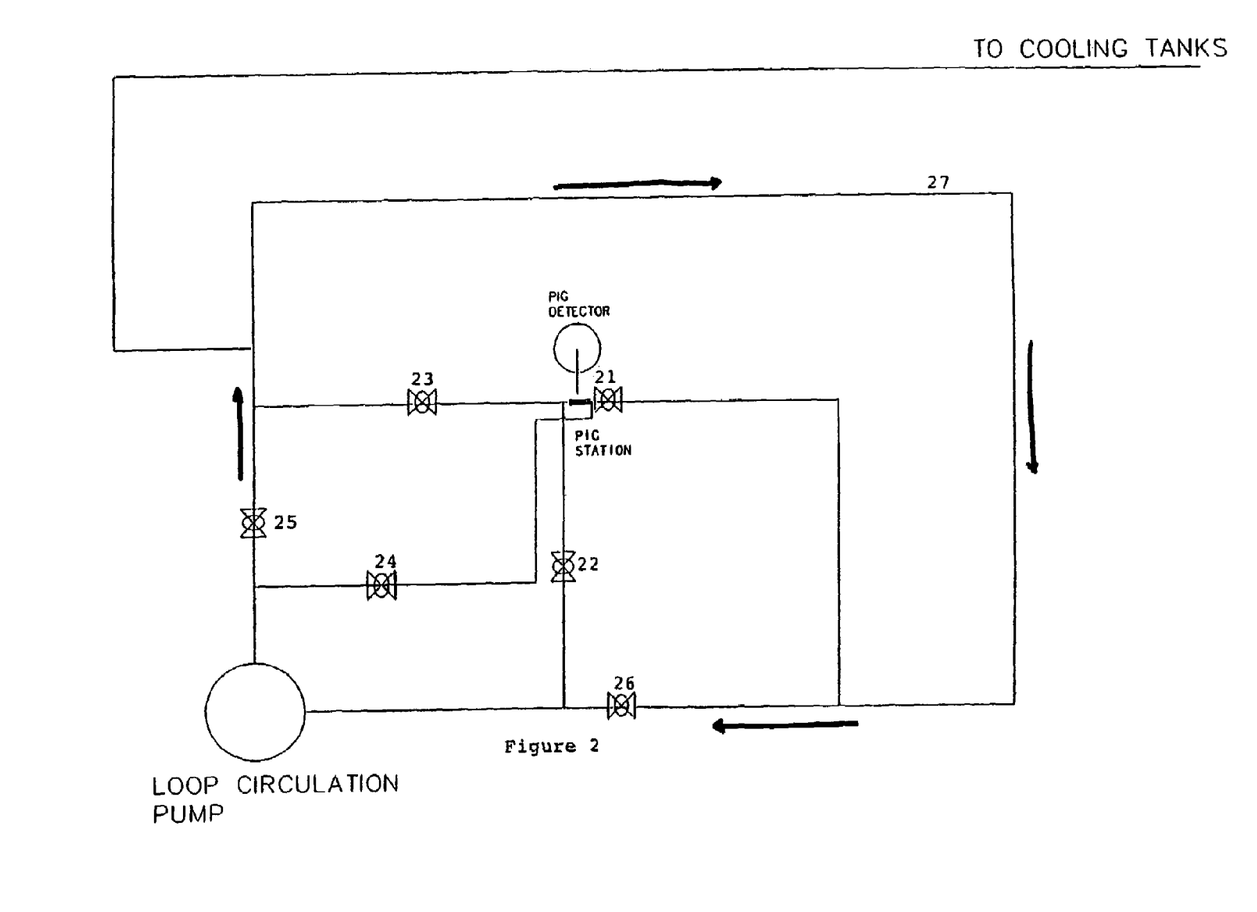
FIG. 2 is a schematic drawing of an alternative embodiment of the closed loop continuous polymerization apparatus of the present invention.

FIG. 2 shows schematically a further embodiment in accordance with the present invention. Again, prior to pigging, the reaction mixture flow is around the reactor tube 27. Product flows to the cooling tanks through none of the valves shown. Water phase enters the circulation pump below valve 25 and is not shown in this figure. Valves 21, 22, 23, and 24 are closed and valve 25 is open when no pigging procedure is being carried out. The procedure to launch and receive the pig is as follows: 1) Check by means of the pig detector that the pig is correctly located in the pig station; 2) open valve 21; 3) open valve 22, if pressure is insufficient to launch the pig, partially close valve 26 until the pig launches successfully; 4) after pig launching, open valve 26 fully and close valves 21 and 22; 5) after 15 seconds, open valves 24 and 23; 6) check that the pig has returned to the pig station after, e.g., 1 minute, if the pig has not been detected within the desired time, partially close valve 25 until a signal on the pig detector is registered, and 7) open valve 25 fully and close valves 23 and 24.

The invention claimed is:

1. A closed loop continuous emulsion polymerization apparatus comprising:
   a circulation pump having an inlet and an outlet,
   a reactor tube connecting the outlet of the circulation pump with the inlet of the circulation pump, said reactor tube being capable of receiving a cleaning pig and having at least one monomer feed, at least one water phase feed, wherein said monomer and said water phase form a polymer emulsion within the reactor tube and said polymer emulsion is recirculated by the circulation pump along the entire length of the reactor tube, and at least one outlet for the discharge of a portion of the polymer emulsion,
   a by-pass tube which circumvents the circulation pump, and a pig receiving station which is in parallel connection with the circulation pump or the reactor tube, said apparatus adapted to enable removal or insertion of the pig receiving station without disruption of the flow of the polymer emulsion.

2. The polymerization apparatus according to claim 1, wherein the pig receiving station is integrated into the by-pass.

3. The polymerization apparatus according to claim 1, wherein the reactor tube has an aperture through which the reactor tube is in fluid communication with the inlet side of the circulation pump and continues on to the outlet side of the circulation pump, the part of the reactor tube between the inlet and outlet sides of the circulation pump serving as the pig receiving station.

4. The polymerization apparatus according to claim 3, wherein the aperture is a slot extending substantially in the longitudinal direction of the reactor tubs.

5. The polymerization apparatus according to claim 4, wherein the width of the slot is smaller than the width of the pig.

6. The polymerization apparatus according to claim 5, wherein the width of the slot increases downstream.

7. The polymerization apparatus according to claim 1, wherein the reactor tube comprises a means for directing the pig into the pig receiving station.

8. The polymerization apparatus according to claim 1, wherein at least a substantial part of the reactor tube forms it least one helical coil.

9. The polymerization apparatus according to claim 1, further comprising a pig detector for checking whether the pig is present in the pig receiving station.

10. A closed loop continuous emulsion polymerization apparatus comprising:
    a circulation pump having a suction side and a delivery side;
    reactor tube which connects the delivery side of the circulation pump to the suction side of the circulation pump, wherein the reactor tube has at least one inlet for monomers feed, at least one inlet for water phase feed, and an outlet for the discharge of a polymer emulsion formed within the reactor tube from the monomers feed and water phase feed;
    a pig for cleaning the apparatus wherein the pig is capable of circulating through the reactor tube;
    a by-pass tube that circumvents the circulation pump; and
    a pig receiving station which is in parallel connection with the circulation pump or the reactor tube and which is releasably engaged to the by-pass tube or the reactor tube such that the pig receiving station is capable of being disengaged from the apparatus without disruption to the flow of the polymer emulsion.

11. The polymerization apparatus according to claim 10, wherein the pig receiving station is integrated into the by-pass.

12. The polymerization apparatus according to claim 10, wherein the reactor tube has an aperture through which the reactor tube is in fluid communication with the inlet side of the circulation pump and continues on to the outlet aide of the circulation pump, the part of the reactor tube between the inlet and outlet aides of the circulation pump serving as the pig receiving station.

13. The polymerization apparatus according to claim 12, wherein the aperture is a slot extending substantially in the longitudinal direction of the reactor tube.

14. The polymerization apparatus according to claim 13, wherein the width of the slot is smaller than the width of the pig.

15. The polymerization apparatus according to claim 14, wherein the width of the slot increases downstream.

16. The polymerization apparatus according to claim 10, wherein the reactor tube comprises a means for directing the pig into the pig receiving station.

17. The polymerization apparatus according to claim 10, wherein at least a substantial part of the reactor tube forms at least one helical coil.

18. The polymerization apparatus according to claim 10, further comprising a pig detector for checking whether the pig is present in the pig receiving station.

* * * * *

UNITED STATES PATENT AND TRADEMARK OFFICE
CERTIFICATE OF CORRECTION

PATENT NO. : 7,261,863 B2  Page 1 of 1
APPLICATION NO. : 09/778192
DATED : August 28, 2007
INVENTOR(S) : Adams et al.

It is certified that error appears in the above-identified patent and that said Letters Patent is hereby corrected as shown below:

Claim 12, column 6, line 46

" inlet and outlet aides " should read

-- inlet and outlet sides --

Signed and Sealed this

Fourth Day of December, 2007

JON W. DUDAS
*Director of the United States Patent and Trademark Office*

UNITED STATES PATENT AND TRADEMARK OFFICE
CERTIFICATE OF CORRECTION

PATENT NO.        : 7,261,863 B2                                                      Page 1 of 2
APPLICATION NO. : 09/778192
DATED             : August 28, 2007
INVENTOR(S)       : Adams et al.

It is certified that error appears in the above-identified patent and that said Letters Patent is hereby corrected as shown below:

Drawings:

Sheet 1 of 2, the direction of the arrow should be reversed as shown on the Certificate of Correction.

Signed and Sealed this

Sixth Day of July, 2010

David J. Kappos
*Director of the United States Patent and Trademark Office*

Sheet 2 of 2, the direction of the arrow should be reversed as shown on the Certificate of Correction.

UNITED STATES PATENT AND TRADEMARK OFFICE
CERTIFICATE OF CORRECTION

PATENT NO.      : 7,261,863 B2                                           Page 1 of 3
APPLICATION NO. : 09/778192
DATED           : August 28, 2007
INVENTOR(S)     : Adams et al.

It is certified that error appears in the above-identified patent and that said Letters Patent is hereby corrected as shown below:

Delete the title page and substitute therefore the attached title page consisting of corrected illustrative figure.

Drawings:

Sheet 1 of 2, the direction of the arrow should be reversed as shown on the Certificate of Correction.

This certificate supersedes the Certificate of Correction issued July 6, 2010.

Signed and Sealed this

Third Day of August, 2010

David J. Kappos
*Director of the United States Patent and Trademark Office*

Sheet 2 of 2, the direction of the arrow should be reversed as shown on the Certificate of Correction.

CERTIFICATE OF CORRECTION (continued)

(12) United States Patent
Adams et al.

(10) Patent No.: US 7,261,863 B2
(45) Date of Patent: Aug. 28, 2007

(54) CLOSED LOOP CONTINUOUS POLYMERIZATION REACTOR AND POLYMERIZATION PROCESS

(75) Inventors: David Charles Adams, Lancashire (GB); Howard Jones, Lancashire (GB); Kenneth Raymond Geddes, Lancashire (GB)

(73) Assignee: Akzo Nobel NV, Arnhem (NL)

(*) Notice: Subject to any disclaimer, the term of this patent is extended or adjusted under 35 U.S.C. 154(b) by 0 days.

(21) Appl. No.: 09/778,192

(22) Filed: Feb. 7, 2001

(65) Prior Publication Data
US 2001/0022951 A1 Sep. 20, 2001

Related U.S. Application Data

(63) Continuation of application No. PCT/EP99/04923, filed on Jul. 8, 1999.

(30) Foreign Application Priority Data
Aug. 7, 1998 (EP) .................................. 98202666

(51) Int. Cl.
*B01J 19/18* (2006.01)
*B08B 9/053* (2006.01)

(52) U.S. Cl. .............. 422/132; 422/135; 15/104.061
(58) Field of Classification Search ........... 422/131, 422/132, 134, 135, 137, 190, 210, 211, 214; 526/64; 15/3.5, 3.51
See application file for complete search history.

(56) References Cited

U.S. PATENT DOCUMENTS

| | | | | |
|---|---|---|---|---|
| 3,220,432 A | * | 11/1965 | Allen | 137/268 |
| 3,425,083 A | | 2/1969 | Wennerberg et al. | 15/104.06 |
| 3,428,489 A | * | 2/1969 | Gentry, Jr. | 134/8 |
| 3,547,142 A | * | 12/1970 | Webb | 137/268 |
| 3,595,846 A | * | 7/1971 | Rouzier | 526/64 |
| 3,682,186 A | | 8/1972 | Howe | 137/1 |
| 5,242,827 A | * | 9/1993 | Chaumont et al. | 435/292.1 |

FOREIGN PATENT DOCUMENTS

| | | |
|---|---|---|
| DE | 32 33 557 | 3/1984 |
| EP | 0 633061 | 1/1995 |

OTHER PUBLICATIONS

Maurice Wilkinson and Ken Geddes, "An Award Winning Process", Chemistry in Britain, Dec. 1993, pp. 1050-1053.

* cited by examiner

*Primary Examiner*—Glenn Caldarola
*Assistant Examiner*—Jennifer A. Leung
(74) *Attorney, Agent, or Firm*—David H. Vickrey; Michelle J. Burke (57) ABSTRACT

A closed loop continuous emulsion polymerization apparatus at least comprising a circulation pump, a reactor tube which connects the outlet of the circulation pump to its inlet, at least one feed for supplying raw materials, an outlet, and means for cooling the tube, characterized in that the reactor further comprises an additional tube for by-passing a pig around the circulation pump, a pig receiving station which is in parallel connection with the circulation pump or the reactor tube, and optionally means for directing a pig into the pig receiving station. The invention allows simple removal of the pig from the reactor, affords great freedom in selecting the type of circulation pump and material and shape of the pig, and enables total control over the launching of the pig substantially independent of the reaction medium flow.

18 Claims, 2 Drawing Sheets